United States Patent
Smedresman et al.

(10) Patent No.: US 11,002,152 B2
(45) Date of Patent: May 11, 2021

(54) INTEGRATED FAN INLET CASE AND BEARING SUPPORT FOR A GAS TURBINE ENGINE

(71) Applicant: United Technologies Corporation, Farmington, CT (US)

(72) Inventors: Adam G. Smedresman, Larchmont, NY (US); Felicia N. White, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 175 days.

(21) Appl. No.: 16/275,477

(22) Filed: Feb. 14, 2019

(65) Prior Publication Data
US 2020/0263566 A1    Aug. 20, 2020

(51) Int. Cl.
| F01D 25/24 | (2006.01) |
| F01D 25/16 | (2006.01) |
| F02C 7/04 | (2006.01) |
| F04D 29/056 | (2006.01) |

(52) U.S. Cl.
CPC ............. *F01D 25/246* (2013.01); *F02C 7/04* (2013.01); *F04D 29/056* (2013.01); *F05D 2260/30* (2013.01)

(58) Field of Classification Search
CPC .... F01D 25/164; F01D 25/162; F16C 27/045; F16F 15/022; F16F 15/0237
See application file for complete search history.

(56) References Cited

U.S. PATENT DOCUMENTS

| 3,620,641 | A | * | 11/1971 | Keen ....................... F16C 35/00 |
| | | | | 415/229 |
| 6,494,032 | B2 | * | 12/2002 | Udall .................... F01D 21/045 |
| | | | | 415/9 |
| 7,797,922 | B2 | | 9/2010 | Eleftheriou et al. |
| 9,841,056 | B2 | * | 12/2017 | Snow ....................... F01D 25/18 |
| 2001/0020361 | A1 | | 9/2001 | Udall et al. |
| 2005/0002781 | A1 | | 1/2005 | Tonks |
| 2006/0269405 | A1 | | 11/2006 | Euvino, Jr. et al. |
| 2008/0098716 | A1 | | 5/2008 | Orlando et al. |
| 2015/0240867 | A1 | * | 8/2015 | Amador ................ F16C 27/045 |
| | | | | 384/535 |
| 2015/0308344 | A1 | | 10/2015 | Vo et al. |
| 2016/0003105 | A1 | | 1/2016 | Cigal et al. |
| 2016/0186608 | A1 | | 6/2016 | Cigal et al. |
| 2017/0009655 | A1 | * | 1/2017 | Savela ....................... F02C 7/06 |
| 2017/0107854 | A1 | | 4/2017 | Friedl |

FOREIGN PATENT DOCUMENTS

WO    2005012696    2/2005

OTHER PUBLICATIONS

European Search Report for Application No. 20157525.5 dated Aug. 14, 2020.

* cited by examiner

*Primary Examiner* — Justin D Seabe
(74) *Attorney, Agent, or Firm* — Carlson, Gaskey & Olds, P.C.

(57) ABSTRACT

A unitary fan inlet case and bearing support structure for a gas turbine engine includes an annular body having a radially inward ring connected to a radially outward ring via a plurality of struts. A platform protrudes radially inward from the radially inward ring. The platform includes a radially outward facing surface and a radially inward facing surface. The annular body is a single unitary structure.

22 Claims, 5 Drawing Sheets

INTEGRATED FAN INLET CASE AND BEARING SUPPORT FOR A GAS TURBINE ENGINE

TECHNICAL FIELD

The present disclosure relates generally to gas turbine engine support structures, and more specifically to an integrated fan inlet case and bearing support for a gas turbine engine.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Gas turbine engines include rotating components and static components, with the rotating components being supported interior to the static components via one or more bearings. The bearings are supported within bearing support structures, and allow the rotating components to rotate relative to the static components.

SUMMARY OF THE INVENTION

In one exemplary embodiment a unitary fan inlet case and bearing support structure for a gas turbine engine includes an annular body having a radially inward ring connected to a radially outward ring via a plurality of struts, a platform protruding radially inward from the radially inward ring, the platform including a radially outward facing surface and a radially inward facing surface, and wherein the annular body is a single unitary structure.

In another example of the above described unitary fan inlet the radially outward facing surface includes at least one squeeze film damper.

In another example of any of the above described unitary fan inlets the radially outward facing surface includes at least two squeeze film dampers.

In another example of any of the above described unitary fan inlets the platform is connected to the radially inner ring via an inlet case flange and wherein the inlet case flange includes at least one through hole for receiving a fastener.

In another example of any of the above described unitary fan inlets the at least one through hole includes a plurality of through holes distributed circumferentially about the inlet case flange.

In another example of any of the above described unitary fan inlets the through holes are distributed approximately evenly about the inlet case flange.

In another example of any of the above described unitary fan inlets the inlet case flange is oblique to an axis defined by the annular body.

In another example of any of the above described unitary fan inlets the radially outward facing surface is a surface of a first flange and the radially inward facing surface is a surface of a second flange.

In another example of any of the above described unitary fan inlets the first flange and the second flange are separated by a pedestal.

In another example of any of the above described unitary fan inlets the pedestal is oblique to an axis defined by the annular body.

In another example of any of the above described unitary fan inlets the single unitary structure is formed as a unitary structure.

In another example of any of the above described unitary fan inlets the single unitary structure comprises a plurality of segments permanently bonded together.

Another example of any of the above described unitary fan inlets further includes a damper sleeve contacting the radially inward facing surface, wherein the damper sleeve includes a radially inward facing sleeve surface.

In one exemplary embodiment a gas turbine engine includes a compressor section, a combustor section fluidly connected to the compressor section via a primary flowpath, a turbine section fluidly connected to the combustor section via the primary flowpath, a fan mechanically connected to at least one turbine in the turbine section via a shaft, the shaft being supported relative to at least one static structure of the gas turbine engine via a bearing system, the at least one static structure including a fan inlet casing and bearing support defined by an annular body having a radially inward ring connected to a radially outward ring via a plurality of struts, a bearing support portion protruding radially inward from the radially inward ring and including an axially aligned outer flange connected to an axially aligned inner flange via a pedestal, the axially aligned outer flange including a radially outward facing contact surface and the axially aligned inner flange including a radially inward facing contact surface, and wherein the fan inlet casing and bearing support is a single unitary structure.

In another example of the above described gas turbine engine the bearing support portion is connected to the radially inward ring via an inlet case flange and further includes a bearing system case connected to the inlet case flange via a plurality of fasteners.

In another example of any of the above described gas turbine engines the inlet case flange is oblique to an axis defined by the gas turbine engine.

In another example of any of the above described gas turbine engines the pedestal is oblique to an axis defined by the gas turbine engine.

In another example of any of the above described gas turbine engines the bearing support portion is connected to the radially inward ring via an inlet case flange and the inlet case flange is normal to the axis defined by the gas turbine engine.

An exemplary method for supporting a bearing system in a gas turbine engine includes defining a radially outer ring connected to a radially inner ring by a plurality of struts using a unitary body, supporting the bearing system relative to a static structure via a bearing support portion of the unitary body, the bearing support portion protruding radially inward from the radially inner ring and including a radially outward facing sealing surface of a radially outward flange and a radially inward facing surface of a radially inner flange, the radially outward flange being connected to the radially inward flange by a pedestal, and supporting at least one bearing system case component via a plurality of fasteners connecting the at least one bearing system case component to an inlet case flange portion of the unitary body, the inlet case flange portion being a flange connecting the bearing support portion to the radially inner ring.

Another example of the above described exemplary method for supporting a bearing system in a gas turbine engine further includes forming the unitary body as a single component via at least one of a casting process, a composite material forming process, a combination of a bonded metal and composite material forming process, and an additive manufacturing process.

These and other features of the present invention can be best understood from the following specification and drawings, the following of which is a brief description.

DETAILED DESCRIPTION

Figure 1:
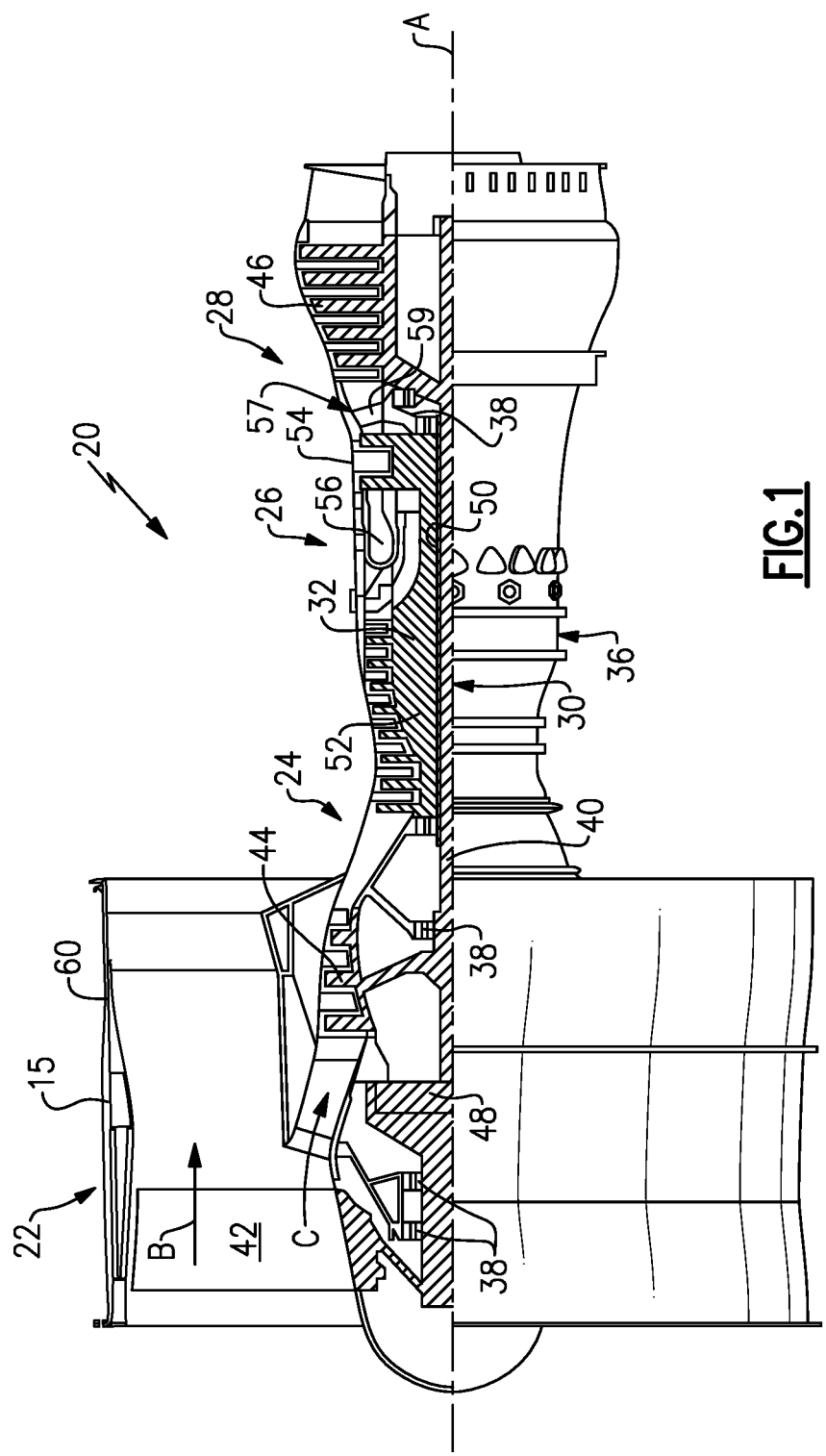
FIG. 1 illustrates a high level schematic view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. In another example, the teachings disclosed herein can be applied to a fan inlet case (FIC) on a non-high bypass engine including engine case struts positioned forward of the fan.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{\wedge 0.5}$. The "Low corrected fan tip speed" as disclosed herein according to one non-limiting embodiment is less than about 1150 ft/second (350.5 meters/second).

Multiple static components of a gas turbine engine, such as a fan inlet case 60, are maintained in a static position relative to an airframe. The static components support rotating components such as the inner shaft 40 and the outer shaft 50 through bearing structures 38. The fan inlet case 60 is an annular body that typically includes a radially outer wall connected to a radially inner wall by multiple struts. The struts have a leading edge at a foreword end of the fan inlet case 60 and are generally airfoil shaped. In existing systems, the radially inner wall is structurally connected to a bearing support via a radially inward protruding flange. The flange includes a radially inward facing contact surface resulting in an interference fit between the radially inward facing contact surface of the flange and a radially outward facing contact surface of the bearing support. The interference fit provides a robust load path and radially maintains the position of the centerline of the damper and rotating hardware relative to the fan inlet case. A bolt, or other fastener, is aligned with an axis defined by the fan inlet case 60 and protrudes through the bearing support and the flange. The bolt assists in maintaining the bearing support in position axially within the engine 20. The bolt can be threaded into another engine component, as shown in the example embodiment, of can be engaged with a nut. In addition to the provided load path, the interference fit provides a seal between the contacting surfaces.

In some examples, an anti-icing system is incorporated within the fan inlet case 60. One example anti-icing system uses a hot airflow to heat the struts and other leading edge portions of the fan inlet case 60. In alternative examples, alternative systems for heating the fan inlet case 60 can be used by alternative anti-icing systems. The heating melts ice that may have accumulated at the leading edge of the engine 20 and allows unimpeded operation. However, due to the heating from the anti-icing systems, as well as the disparate materials used to create the bearing support and the fan inlet case 60, a large thermal gradient occurs between the fan inlet case 60 and the bearing support.

The large thermal gradient causes the fan inlet case 60 to expand more, and at a faster rate, than the bearing support. The expansion disparity results in a potential radial separation between the radially inward facing surface of the flange and the bearing support. The separation breaks the seal and can allow leakage into or out of the bearing systems 38. Further, the separation applies a shearing stress to the bolt, or other fastener, and can decrease the expected lifespan of the system.

Figure 2:
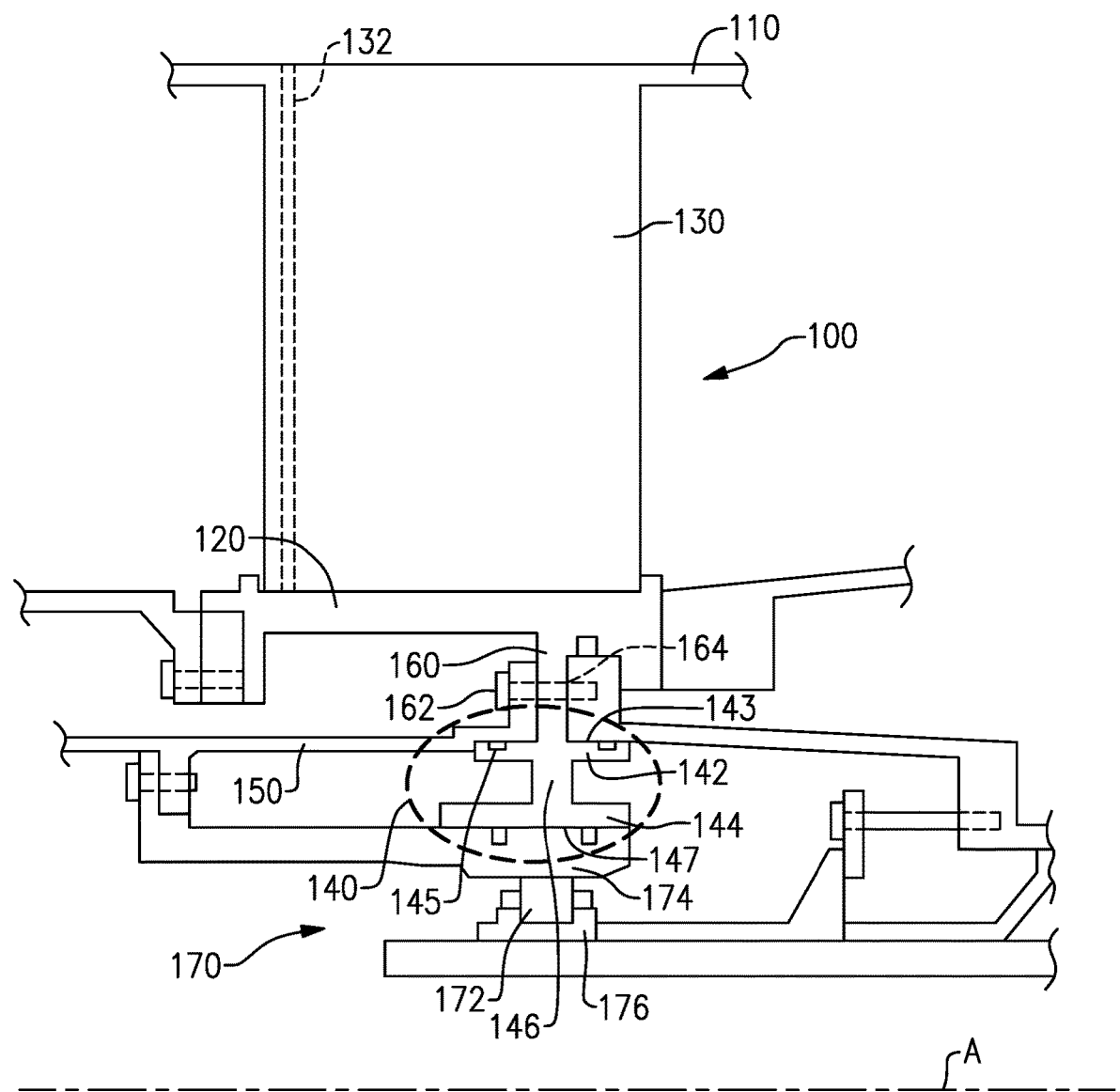
FIG. 2 schematically illustrates a cross sectional view of a unitary fan inlet case and bearing support within a gas turbine engine in an exemplary embodiment.
Figure 3:
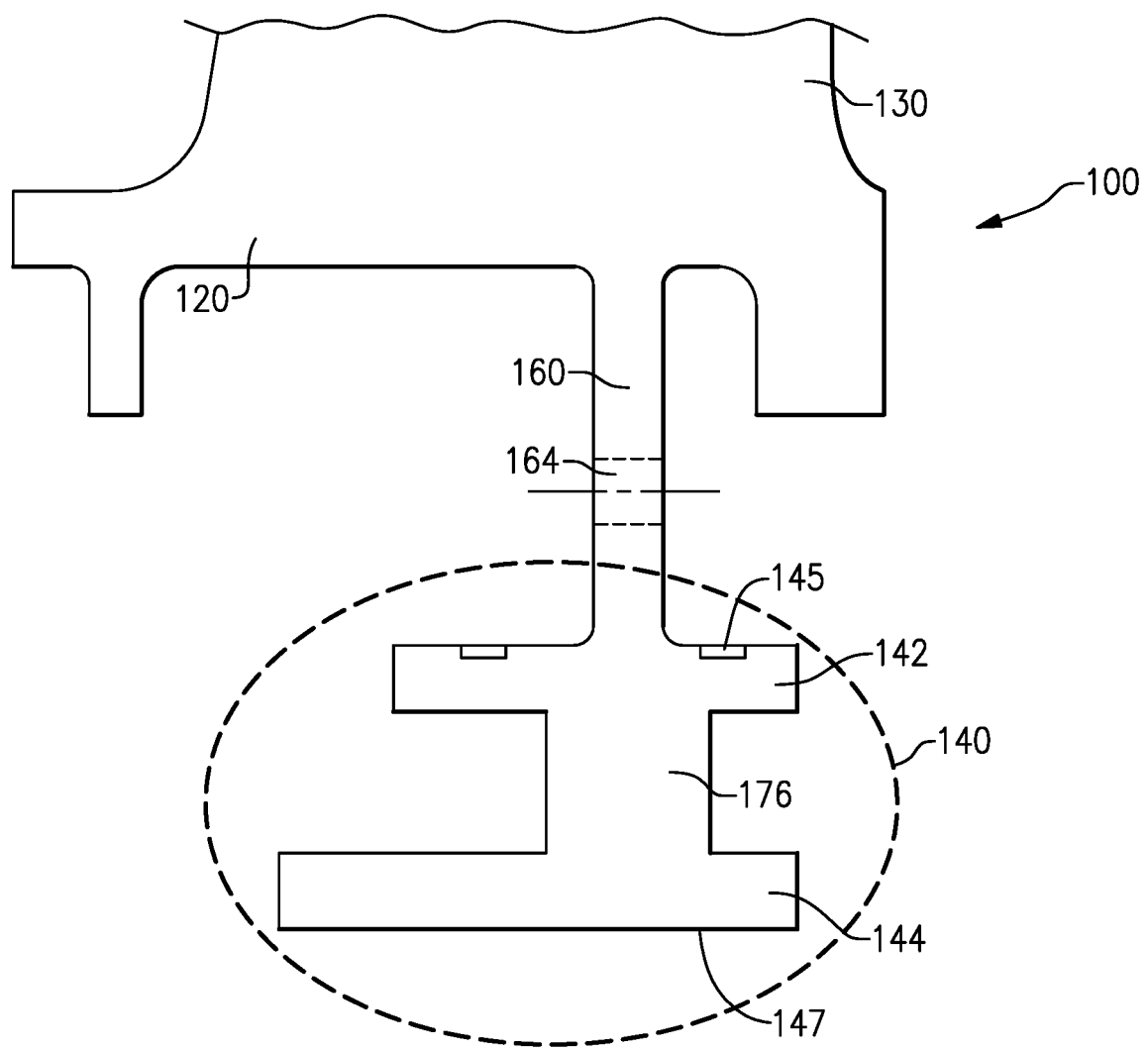
FIG. 3 schematically illustrates a cross sectional view of the integrated fan inlet case and bearing support of FIG. 2 isolated from the context of the engine.

With continued reference to FIG. 1, FIGS. 2 and 3 schematically illustrates a cross sectional view of a fan inlet case and bearing support body 100 provided as a single unitary body. As used herein a "unitary body" refers to a single structure that is either formed as a single structure or is a single structure made up of multiple segments that are permanently bonded together. The fan inlet case and bearing support body 100 (referred to alternately as the body 100) is illustrated in the context of adjacent components included in the engine 20 of FIG. 2, and isolated from that context in FIG. 3. The body 100 is an annular component defining an axis A and including an outer ring portion 110 connected to an inner ring portion 120 via multiple struts 130. Incorporated in each of the struts 130 is an anti-icing system 132, illustrated schematically herein as an internal passage. One of skill in the art will appreciate that any anti-icing system could be incorporated in the strut 130, and the anti-icing system is not limited to the illustrated internal passage 132.

Protruding radially inward from the inner ring 120 is a bearing support structure 140. The bearing support structure 140 includes a first platform 142 and a second platform 144 connected to each other by a pedestal 146. The first platform 142 has a radially outward facing surface 143 that forms a sealing surface contacting a housing 150. Embedded within the radially outward facing surface 143 are multiple squeeze film dampers 145. The squeeze film dampers 145 dampen vibrational translation from the bearing compartment 170 to the body 100. The first platform 142 is connected to the inner ring 120 via an inlet casing flange 160, and the housing 150 is maintained in contact with the inlet casing flange 160 via one or more fasteners 162 protruding through corresponding axially aligned through holes 164 in the inlet casing flange 160.

The through holes 164 in the inlet casing flange 160 are, in one example, circumferentially distributed approximately evenly about the inlet case flange 160. As used herein, "approximately evenly" refers to a generally even circumferential distribution inclusive of minor variations (to the order of 5 degrees or less) to accommodate varying engine structures and manufacturing tolerances. In alternative examples, the circumferential distribution can be uneven, depending on the structure and needs of a given engine. In the example illustrated at FIG. 2, the inlet case flange 160 is normal to the axis A. In alternative examples, such as those illustrated in FIGS. 4 and 5, the inlet case flange 160 can be oblique to the axis A and achieve similar effects.

The radially inward facing surface 147 of the radially inward platform 144 contacts an outer race 174 of a bearing 170, and the outer race 174 is connected to the housing 150. Radially inward of the outer system race is an exemplary bearing 172. Radially inward of the exemplary bearing 172 is an inner race 176. The disclosed integrated fan inlet case and bearing support body 100 can be utilized in alternate configurations with other bearing system, with the radially inward facing surface 147 of the radially inward platform 144 contacting an outer race.

Due to the unitary nature of the body 100, the body 100 can be formed as a single structure. By way of example, the body 100 can be cast in a single casting step, additively manufactured as a single component, created using a composite forming process, created using a combination of bonded metal and a composite forming process, or created using any other technique configured to create a single unitary body. In alternative examples, the body 100 can be created as multiple radial segments, with the segments being permanently bonded together, such as by welding or any other similar bonding process to form the annular shape. The resultant structure of either is a single annular body 100 that includes both the fan inlet case 100 and the bearing support 140.

During operation of the gas turbine engine 20, vibrational loads, and other similar loads are transferred from the bearing system 170 into the body 100, and into other static structures of the gas turbine engine 20. The utilization of a unitary structure for the body 100 improves the damper performance by reducing closures due to interference, and thereby reducing a nominal damper gap and improving the performance of the squeeze film dampers 145.

Figure 4:
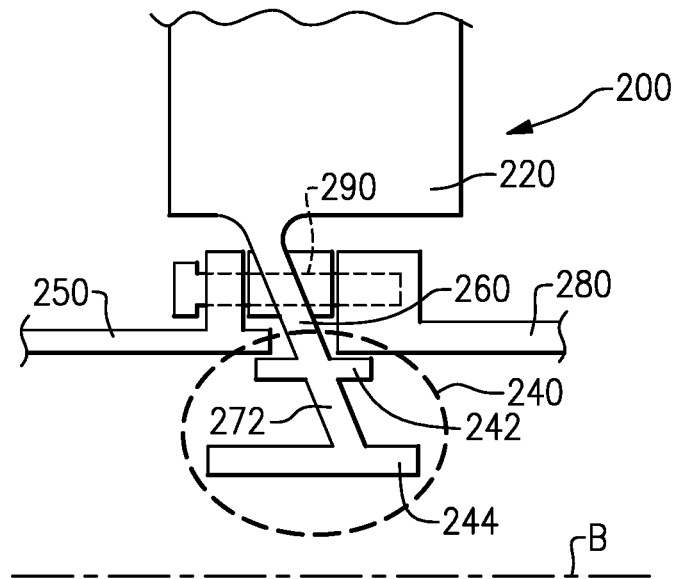
FIG. 4 schematically illustrates a cross sectional view of the integrated fan inlet case and bearing support of FIG. 2 including a first variation.

In some examples, normal orientation of the flange 160 relative to the axis A provides less than ideal translation of loads, such as vibrational loads, from the bearing and provides compliance with stresses associated with a thermal gradient between the compartment 170 and the static structures of the engine. With continued reference to FIGS. 1-3, and with like numerals indicating like elements, FIG. 4 schematically illustrates an alternate example configuration that improves load transfer characteristics of a unitary annular body 200 and reduces stresses introduced due to thermal gradient, relative to the example of FIG. 2.

The unitary annular body 200 includes an inner ring 220 connected to a bearing support portion 240 via an inlet case flange 260. The inlet case flange 260 is angled relative to an axis B defined by the annular body 200. This angling is referred to as the inlet case flange 260 being oblique to the axis B. In addition to angling the inlet case flange 260, the pedestal 272 connecting the first platform 242 and the second platform 244 is provided with a similar angling feature. While illustrated herein as the same angle, it is appreciated that the pedestal 272 and the inlet case flange 260 can be at distinct angles from each other, and still both be oblique to the axis B.

In order to facilitate mounting the bearing system case 250, as well as any other static components 280 to the unitary body 200, a mounting block 290 is included at the angled inlet case flange 260 and provides surfaces normal to the axis B, through which the bearing case 250 and the additional static components 280 can be interfaced to the unitary body 200.

Figure 5:
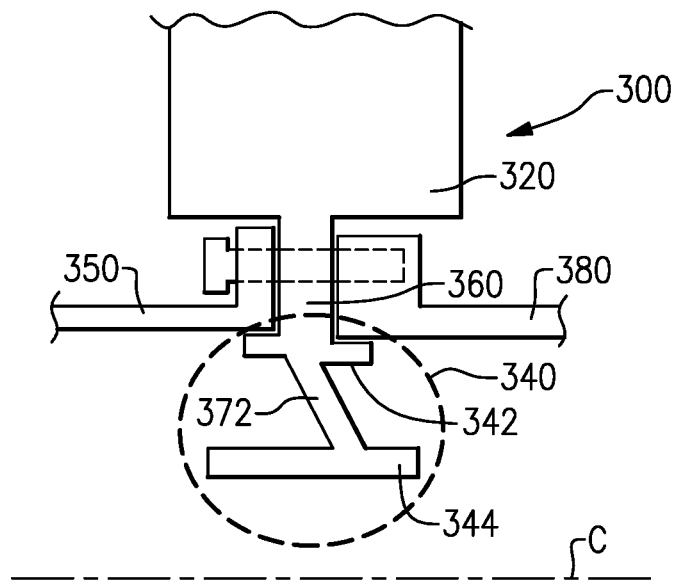
FIG. 5 schematically illustrates a cross sectional view of the integrated fan inlet case and bearing support of FIG. 2 including a second variation.

With continued reference to FIGS. 1-4, and with like numerals indicating like elements, FIG. 5 illustrates another example configuration that incorporates at least a portion of the benefits from the angled inlet case flange 260 and the angled pedestal 272 without requiring the incorporation of the mounting block 290. In the example of FIG. 5, the singular annular body 300 includes an inner ring 320 connected to a bearing support portion 340 via an inlet case flange 360. The inlet case flange 360 is normal to the axis C defined by the annular body 300. Unlike the inlet case flange 360, the pedestal 372 connecting the first platform 342 and the second platform 344 is oblique to the axis C. The angled pedestal provides at least a portion of the vibrational benefits and thermal gradient stress reduction benefits of the configuration illustrated in FIG. 4, while the normal inlet case flange 360 allows for simplified interconnections with the bearing case 350 and the additional engine components 380.

Figure 6:
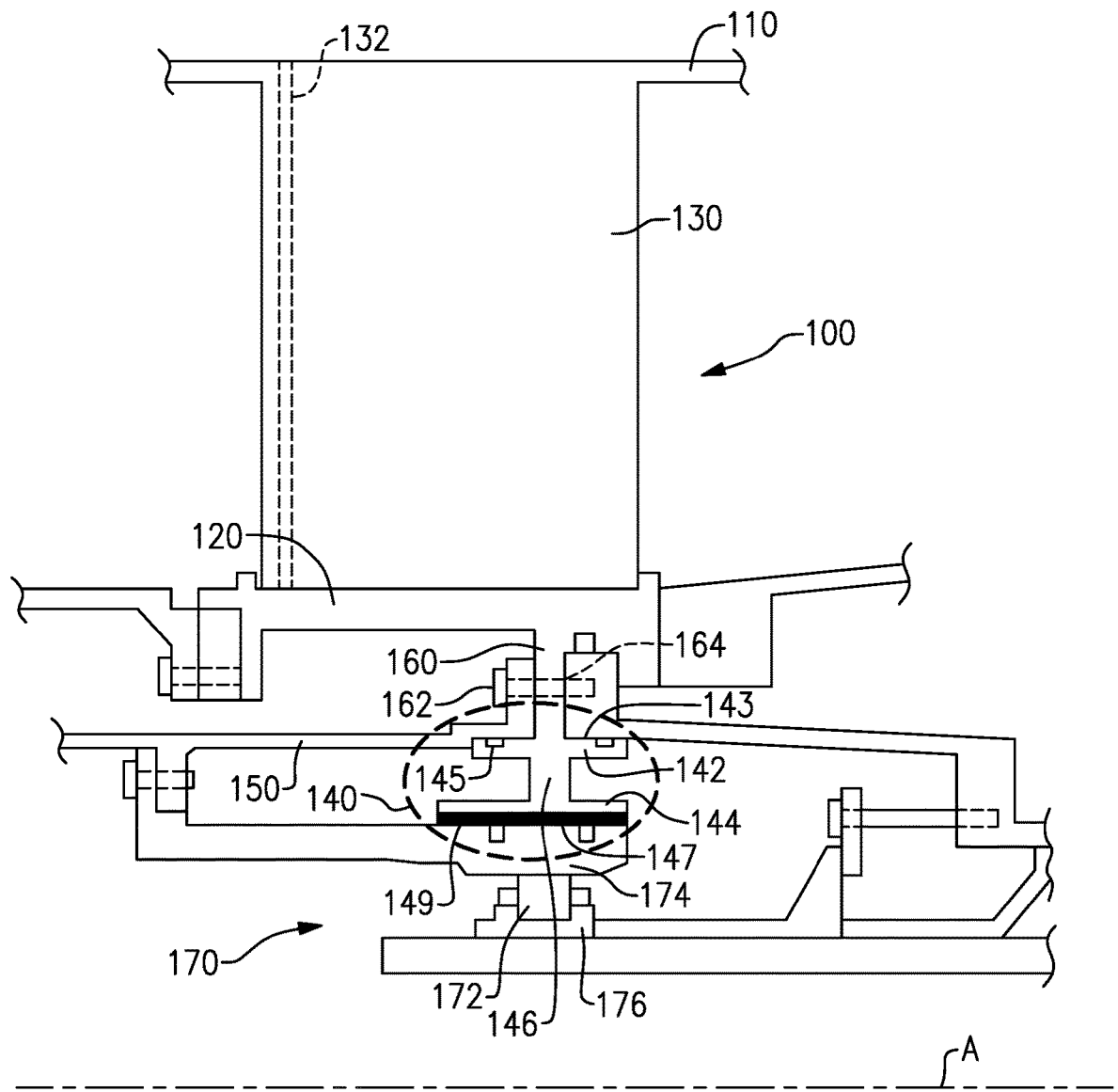
FIG. 6 schematically illustrates a cross sectional view of the unitary fan inlet case and bearing support of FIG. 2, with an added damper sleeve.

With continued reference to FIGS. 2-5, FIG. 6 schematically illustrates the example of FIG. 2 with the addition of a distinct damping sleeve 149 attached to the bearing support 144. The damping sleeve 149 is attached via a radial interference fit and axial retention of the damping sleeve 149 is achieved using a nut, a retaining ring, or any similar feature. In the example of FIG. 6, the radial surface 147 is part of the damping sleeve 149 instead of part of the bearing support 140, 240, 340 as shown in FIGS. 2-5. This configuration allows for improved modularity of the assembly. In the case of damage to the damper surface, only the damping sleeve 149 must be replaced or repaired instead of repairing or replacing the entirety of the fan inlet case. Further, the damping sleeve 149 can be incorporated with each of the alternative examples of FIGS. 4 and 5 to achieve the same effect.

In yet further examples, the bearing support 140, 240 340 can include any conventional anti-rotation feature to prevent rotation of the damping sleeve 149.

It is further understood that any of the above described concepts can be used alone or in combination with any or all of the other above described concepts, and can be extended to any particular engine example beyond that of FIG. 1. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A unitary fan inlet case and bearing support structure for a gas turbine engine comprising:
   an annular body having a radially inward ring connected to a radially outward ring via a plurality of struts; and
   a bearing support structure protruding radially inward from the radially inward ring, the bearing support structure including a radially outward facing surface of a first axially aligned flange and a radially inward facing surface of a second axially aligned flange, wherein the first axially aligned flange and the second axially aligned flange are separated by a pedestal and the first axially aligned flange is radially outward of the second axially aligned flange;
   wherein the annular body is a single unitary structure; and
   wherein the radially outward facing surface includes at least one squeeze film damper.

2. The unitary fan inlet case and bearing support structure of claim 1, wherein the radially outward facing surface includes at least two squeeze film dampers.

3. The unitary fan inlet case and bearing support structure of claim 1, wherein the bearing support structure is connected to the radially inner ring via an inlet case flange and wherein the inlet case flange includes at least one through hole for receiving a fastener.

4. The unitary fan inlet case and bearing support structure of claim 3, wherein the at least one through hole includes a plurality of through holes distributed circumferentially about the inlet case flange.

5. The unitary fan inlet case and bearing support structure of claim 4, wherein the through holes are distributed approximately evenly about the inlet case flange.

6. The unitary fan inlet case and bearing support structure of claim 3, wherein the inlet case flange is oblique to an axis defined by the annular body.

7. The unitary fan inlet case and bearing support structure of claim 1, wherein the pedestal is oblique to an axis defined by the annular body.

8. The unitary fan inlet case and bearing support structure of claim 1, wherein the single unitary structure comprises a plurality of segments permanently bonded together.

9. The unitary fan inlet case and bearing support structure of claim 1, further comprising a damper sleeve contacting the radially inward facing surface, wherein the damper sleeve includes a radially inward facing sleeve surface.

10. The unitary fan inlet case and bearing support structure of claim 3, wherein the inlet case flange is radially aligned relative to a radius of the annular body.

11. The unitary fan inlet case and bearing support structure of claim 1, wherein the inlet case flange joins the radially inward ring at a position offset from each axial end of the radially inward ring.

12. The unitary fan inlet case and bearing support structure of claim 11, further comprising a second inlet case flange disposed at a first axial end of the radially inward ring and a third inlet case flange disposed near a second axial end of the radially inward ring.

13. The unitary fan inlet case and bearing support structure of claim 12, wherein the first inlet case flange is disposed axially between second inlet case flange and the third inlet case flange.

14. The unitary fan inlet case and bearing support structure of claim 3, wherein the first axially aligned flange extends axially fore and axially aft of the inlet case flange.

15. The unitary fan inlet case and bearing support structure of claim 1, wherein the second axially aligned flange is has a longer axial length than the first axially aligned flange.

16. A gas turbine engine comprising:
a compressor section;
a combustor section fluidly connected to the compressor section via a primary flowpath;
a turbine section fluidly connected to the combustor section via the primary flowpath;
a fan mechanically connected to at least one turbine in the turbine section via a shaft, the shaft being supported relative to at least one static structure of the gas turbine engine via a bearing system;
the at least one static structure including a fan inlet casing and bearing support defined by an annular body having a radially inward ring connected to a radially outward ring via a plurality of struts, a bearing support portion protruding radially inward from the radially inward ring and including an axially aligned outer flange connected to an axially aligned inner flange via a pedestal, the axially aligned outer flange including a radially outward facing contact surface and the axially aligned inner flange including a radially inward facing contact surface; and
wherein the fan inlet casing and bearing support is a single unitary structure; and
wherein the radially outward facing surface includes at least one squeeze film damper.

17. The gas turbine engine of claim 16, wherein the bearing support portion is connected to the radially inward ring via an inlet case flange and further includes a bearing system case connected to the inlet case flange via a plurality of fasteners.

18. The gas turbine engine of claim 17, wherein the inlet case flange is oblique to an axis defined by the gas turbine engine.

19. The gas turbine engine of claim 16, wherein the pedestal is oblique to an axis defined by the gas turbine engine.

20. The gas turbine engine of claim 19, wherein the bearing support portion is connected to the radially inward ring via an inlet case flange and the inlet case flange is normal to the axis defined by the gas turbine engine.

21. A method for supporting a bearing system in a gas turbine engine comprising:
defining a radially outer ring connected to a radially inner ring by a plurality of struts using a unitary body;
supporting the bearing system relative to a static structure via a bearing support portion of the unitary body, the bearing support portion protruding radially inward from the radially inner ring and including a radially outward facing sealing surface of a radially outward flange and a radially inward facing surface of a radially inner flange, the radially outward flange being connected to the radially inward flange by a pedestal, and wherein the radially outward flange includes at least one squeeze film damper; and
supporting at least one bearing system case component via a plurality of fasteners connecting the at least one bearing system case component to an inlet case flange portion of the unitary body, the inlet case flange portion being a flange connecting the bearing support portion to the radially inner ring.

22. The method of claim 21, further comprising forming the unitary body as a single component via at least one of a casting process, a composite material forming process, a combination of a bonded metal and composite material forming process, and an additive manufacturing process.

* * * * *